United States Patent

Preusker

[11] Patent Number: 5,309,967
[45] Date of Patent: May 10, 1994

[54] ANTISKID DEVICE FOR VEHICLE WHEELS

[75] Inventor: Werner Preusker, Sauldorf, Fed. Rep. of Germany

[73] Assignee: Confon AG, Rheineck, Switzerland

[21] Appl. No.: 4,999

[22] Filed: Jan. 15, 1993

[30] Foreign Application Priority Data

Feb. 7, 1992 [DE] Fed. Rep. of Germany ........ 4203612

[51] Int. Cl.$^5$ .............................................. B60C 27/02
[52] U.S. Cl. .................... 152/216; 152/213 R; 301/43
[58] Field of Search .............. 152/208, 213 A, 213 R, 152/214, 216, 233, 236, 241; 301/38.1, 41.2, 41.1, 43

[56] References Cited

U.S. PATENT DOCUMENTS

| | | | |
|---|---|---|---|
| 2,174,345 | 9/1939 | Worthing | 152/233 X |
| 2,575,263 | 11/1951 | Eisenhauer, Sr. | 152/225 R |
| 4,735,248 | 4/1988 | Cizaire | 152/213 A |

Primary Examiner—Michael W. Ball
Assistant Examiner—Francis J. Lorin
Attorney, Agent, or Firm—Herbert Dubno; Yuri Kateshov

[57] ABSTRACT

An antiskid device for vehicle wheels, having a retaining device which is coaxially attached on one side of the wheel rim or the wheel disc and which via arms disposed transversely of the running direction and engaging over the wheel running surface retains an antiskid chain bearing against the wheel running surface, the arms being pivotably attached to the retaining device via joints whose pivots are at right angles to the wheel axle and to the wheel radius extending through the joint, while via the joint the arms can also be pivoted around an axis parallel to the wheel axle, the arm ends attached in the joint being located in a recess in the retaining device which opens in the direction of the wheel side and has inclined lateral surfaces which return the arm end from an inclined position to a radial position.

7 Claims, 2 Drawing Sheets

ANTISKID DEVICE FOR VEHICLE WHEELS

FIELD OF THE INVENTION

The invention relates to an antiskid device for vehicle wheels, which is coaxially attached on one side of the wheel rim or the wheel disc and which via arms disposed transversely of the running direction and engaging over the wheel running surface retains an antiskid means bearing against the wheel running surface. The arms are pivotably attached to the retaining device via joints whose pivots are at right angles to the wheel axle and to the wheel radius extending through the joint.

BACKGROUND OF THE INVENTION

It is known to form the lateral retaining device of an antiskid device with radial projections having a joint pivot to which an arm is articulated which engages over the running surface of the motor vehicle wheel and retains an antiskid means. In the case of these known antiskid devices it has been found that the arms must move around an axis parallel to the wheel axle in the zone of the joint, while after such a limited pivoting of the arm around the axis, the arm must be automatically reset. This, however, has not been designed.

OBJECT OF THE INVENTION

It is an object of the invention to improve a known antiskid device that the arms on the retaining device can move to a limited extent on both sides in the zone of the joint around an axis parallel to the wheel axle and can be automatically reset.

SUMMARY OF THE INVENTION

This goal is achieved according to the invention by providing the arms pivoted around an axis parallel with the wheel axle. The arm ends attached in the joint are located in a recess formed in the retaining device and facing the lateral surface of the wheel and provided with inclined lateral surfaces which create the possibility for the arm end to move from an inclined position with respect to the axle to a radial position characterized by the arm extending over the running surface of the wheel.

As a result, with a very simple construction the arm can be pivoted in the zone of the joint around a pivot extending along an axis perpendicular to the wheel axle, while at the same time ensuring that after such a limited pivoting due to the inclined lateral surfaces the arm and the recess is automatically reset.

Particularly advantageously the lateral surfaces are tapering outwardly from the lateral surface of the wheel.

Preferably according to the invention the arm end is bent over in hook shape and engages around the joint pivot. Such structure provides ready assembly with a very simple construction. Also according to the invention the hook-shaped arm end can be inserted in a rectangular opening of the retaining device which is bounded by the joint pivot forming a side of the opening which is the closest to the running surface of the wheel. Particularly advantageously the arms

- can be pivoted outwardly from the axle (or from the tire running surface) only to a limited extent;
- are radially displaceable in the guide means formed in the radial projection of the retaining device;
- are radially displaceable in the guide and at the same time remain pivotable via the inclinations of the lateral surfaces of the recess;
- are pivotable over a range of radial pivotability defined by the lateral surfaces of the recess;
- are to be folded together latched in the end zone of the projection. (This point is important, so that the arms are locked after being folded together).

BRIEF DESCRIPTION OF THE DRAWING

The above and other objects, features and advantages will become more readily apparent from the following description, references being made to the drawings, wherein.

SPECIFIC DESCRIPTION

Figure 1:
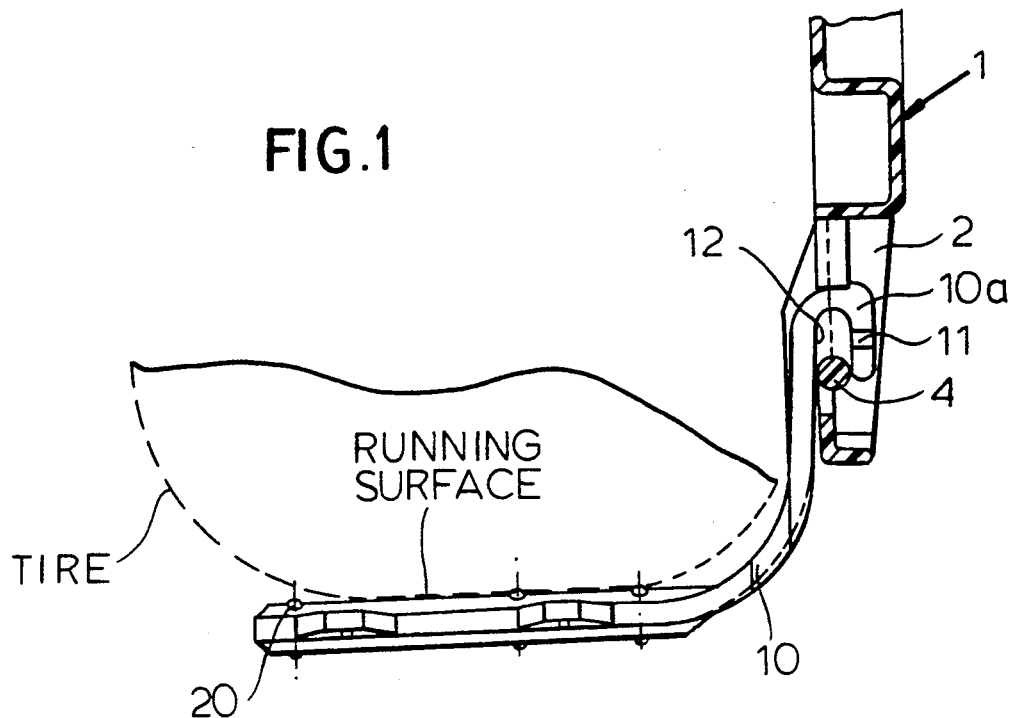
FIG. 1 is a radial sectional view of the retaining device as a detail of a radial projection to which an arm is articulated.
Figure 2:
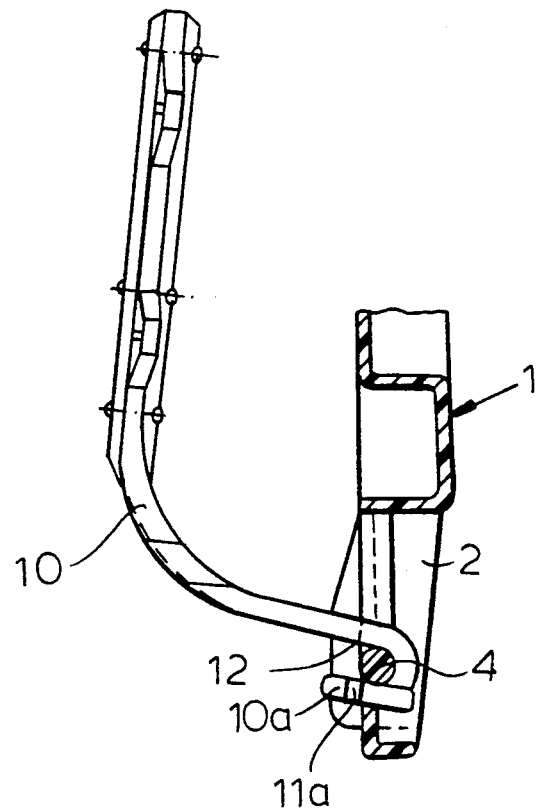
FIG. 2 is a radial sectional view corresponding to FIG. 1 with an arm in the inwardly hinged position.
Figure 3:
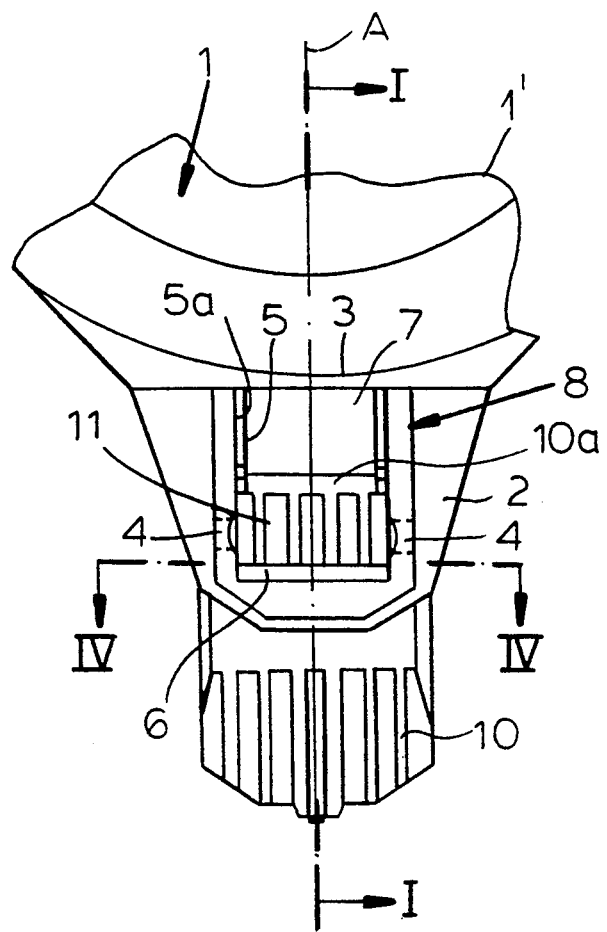
FIG. 3 is a side elevational view of the device shown in FIG. 1 viewed from the front of the device.
Figure 4:
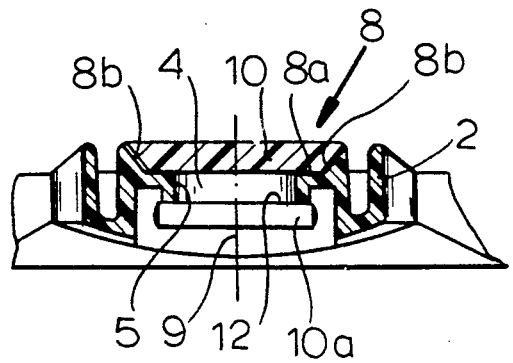
FIG. 4 is a section taken along the line IV—IV in FIG. 3.

A round, disc-shaped retaining device 1 (FIG. 3) is rotatably coaxially attached to the outer lateral side of a motor vehicle wheel having a center axis A disc 1' and more particularly has four radial projections 2 at equal angular distances. Attached to the projection 2 transversely of radius 3 thereof is a joint pivot 4 which extends through a rectangular opening 5 (FIG. 4) in the projection 2, thereby dividing the opening 5 into an outer opening 6 and an inner opening 7 with respect to the wheel axle. Mounted on the joint pivot 4 is a hook-shaped end 10a of an arm 10 whose free end engages around the running surface of the motor vehicle wheel, where it retains an antiskid means 20. The hook-shaped end of the arm is inserted diagonally or at an angle into the inner opening 7 and then guided on the pivot 4. The inner end of the arm 10 is located in a recess 8 which opens in the direction of the lateral surface of the tire and has a bottom 8a and inclined lateral surfaces 8b. The lateral surfaces 8b widen the recess 8 as the distance to the bottom 8a increases or the distance to the lateral surface of the tire decreases. Due to this shape of the recess 8, when the arm makes a limited pivoting movement around axis 9 parallel with the wheel axle, an inner edge 10b of the arm 10 FIG. 1 is lifted out of the recess 8, since the side of the arm adjacent the projection 2 is shaped or laterally chamfered in correspondence with the recess 8 and is therefore located positively in the recess 8. When, therefore, the arm 10 is pivoted around the axis 9, the inner edge is partly lifted out of the recess 8. However, since the inner end 10a of the arm disposed closer to upon pivoting the wheel axle still remains partly located in the recess 8, the inclined lateral surfaces 8b produce a resetting effect, so that after the arm has pivoted towards one of the sides, it pivots back again.

While as a rule the arms are pivoted out of the recess 8 by the antiskid means, the pivoting back is due to the lateral surfaces 8b. This gives the arms retaining the antiskid means an additional mobility.

The joint 4 has a pair of radial stop, more particularly taking the form of a projections, which limits the pivoting of the arm away from the tire running surface.

In the unassembled state of the antiskid device on the wheel the arm is retained locked in the inwardly hinged state in the inner end zone.

At its end attached to the joint, the arm 10 has an elongate inner space 12 through which the joint pivot extends, so that the arm can be radially displaced along guide edges 5a of the opening 5 while always remaining pivotable.

The hook-shaped end 10a of the arm 10 has on the sides adjacent the edges of the opening 5 lateral projections, more particularly knobs 11 which in the inwardly and/or outwardly hinged state of the arm lock the arm releasably in that particular position by engaging the edges 11a.

I claim:

1. An antiskid device for vehicle wheel having a running surface, the device comprising:
    a retaining disk having a central axis and mountable coaxially with the wheel from one side thereof;
    a plurality of projections formed at equal angular distances on and extending radially outwardly from the retaining device, each of the projections being provided with:
    a respective recess facing the wheel and being formed with a respective pair of lateral surfaces extending radially outwardly toward the running surface and converging axially outwardly, and
    a respective joint extending perpendicular to a radius of the respective projection transverse to the respective pair of lateral surfaces;
    a respective arm extending transversely to a running direction of the wheel and formed with a respective inner end mounted on each of the projections and with a respective outer end extending across the running surface of the wheel; and
    respective antiskid means for preventing a vehicle from skidding and formed on the respective outer end of the respective arm, each arm being pivotally mounted on the respective joint and also so as to pivot about a respective pivot axis parallel to the central axis, the lateral surfaces of the respective recess engaging the inner end for guiding same in an operative position of the respective arm upon engaging of the respective antiskid means with a ground.

2. The antiskid device defined in claim 1 wherein the inner end of the arm is a hook shape end engaging rotatably the respective joint between the operative position and a locking position defined by engagement of the inner end of the arm and the joint, the outer end of the arm extending radially inwardly in the locking position.

3. The antiskid device defined in claim 2 wherein the recess is formed with a window divided in an inner opening and an outer opening by the respective joint, the inner end of the arm projecting into the inner opening in the locking position.

4. The antiskid defined in claim 1 wherein the joint is provided with stop means for preventing the arm from pivoting angularly outwardly from the operative position.

5. The antiskid device defined in claim 1 wherein the recess is further provided with a respective means extending radially inwardly from the joint for guiding the respective arm radially.

6. The antiskid device defined in claim 3 wherein the outer openings is formed with a pair of ribs extending radially outwardly from the joint and spaced apart in the running direction, the ribs being formed with respective lateral surfaces engaging respective lateral projections formed on the inner end of the arm.

7. The antiskid device defined in claim 1 wherein the inner end of the arm is provided with a pair of lateral edges formed respectively with inclined surfaces complementary to end engaging the lateral surfaces of the respective recess in the operative position.

* * * * *